United States Patent [19]
Hsu et al.

[11] Patent Number: 5,812,662
[45] Date of Patent: Sep. 22, 1998

[54] METHOD AND APPARATUS TO PROTECT COMPUTER SOFTWARE

[75] Inventors: Jerry Hsu, Yun-Lin Shan; Sidney Shen, Taipei, both of Taiwan

[73] Assignee: United Microelectronics Corporation, Hsinchu, Taiwan

[21] Appl. No.: 518,930

[22] Filed: Dec. 18, 1995

[51] Int. Cl.$^6$ ............................. H04L 9/00; G06F 12/14
[52] U.S. Cl. ............................................. 380/4; 395/490
[58] Field of Search ....................... 380/3, 4, 5; 395/490

[56] References Cited

U.S. PATENT DOCUMENTS

| | | |
|---|---|---|
| 4,462,076 | 7/1984 | Smith . |
| 4,905,280 | 2/1990 | Wiedemer ................................. 380/16 |
| 5,004,232 | 4/1991 | Wong et al. . |
| 5,070,479 | 12/1991 | Nakagawa . |
| 5,155,768 | 10/1992 | Matsuhara . |
| 5,448,045 | 9/1995 | Clark . |
| 5,592,651 | 1/1997 | Rackman . |

Primary Examiner—Stephen C. Buczinski
Attorney, Agent, or Firm—Barnes,Kisselle, Raisch,Choate, Whittemore & Hulbert, P.C.

[57] ABSTRACT

An apparatus for protecting a software in a program-controlled object such as a video game having a main part with a controlling means and a peripheral equipment; and a replaceable part with a software comprising an execution program. The apparatus comprises a data generator located on the replaceable part for producing a specific data; a selection means located on the replaceable part and controlled from the main part, for selecting a mode of generation of the specific data; and an interface circuit for connecting the data generator and the selection means to the main part.

A method for protection a software running a video game or other program-controlled object resides in providing an inspection program with a predetermined data in the software, initializing generating a specific data, reading the specific data and cooperating the specific data with the predetermined data. The positive result of the cooperation that can be a comparison, a calculation, a decoding, etc. is used to verify the existence of an authorized hardware and give an authorization for performing the execution program running the object.

10 Claims, 3 Drawing Sheets

METHOD AND APPARATUS TO PROTECT COMPUTER SOFTWARE

FIELD OF THE INVENTION

The present invention generally relates to a method and apparatus to protect computer software, and more particularly, sets forth and claims a novel method and apparatus for protecting computer software from copying or unauthorized usage. Specifically though not exclusively, the present invention is applicable to video games.

BACKGROUND OF THE INVENTION

Video games presently available in the marketplace include two major parts, i.e. the main console and the software cartridge. Usually, a user buys a game console, then buys cartridges with his favorite games, plugs them in, and plays games.

The software program and data on the cartridge are normally stored in an IC memory device and constitute a game cartridge.

As these game cartridges were developed, they drew specific attention to a disadvantage of these systems, namely protection from unauthorized copying. By and large, in recent years, piracy of software has become a major concern for software related companies. Pirates have used borrowed and rented software to extract illicit copies of such software. Software piracy is, in practice, difficult to prevent because it is generally easy for users to make multiple copies of the programs for unauthorized users, and easy for competitors to repackage and distribute valuable programs at a fraction of the cost to the original developer. Given the expense and complexity of many current software packages, it is important to the software developer that each authorized user pay for the program used and not reproduce the programs to be used by others or at other sites.

Therefore, considering the enormous amount of damages incurred by the computers and video games industries which arise from software piracy, there is a strong incentive to prevent loss of such information to the potential pirate and it is understandable that efforts have been made to prevent unauthorized copying.

How one prevents a pirate from illegally copying software is a question of "software protection". Ideally, software protection should be comprehensive enough that when a potential pirate executes the program, he can gain no information from the execution which will help him understand the operation of the program other than the input and output. In essence, comprehensive software protection should cause the software to act as a "black box" where only the input and output are available to all users. Levels of software protection less than the "black box" level of protection give away information that may be useful to the pirate. For instance, even leaving a pattern of memory accesses unprotected when a program is executing gives away information about the program.

There are numerous protection methods for protecting software in personal computers ranging from an Apple to an IBM PC which methods could be applicable to video games as well. One approach resides in that a magnetic disk can be given a special treatment such that it cannot be easily duplicated. For instance, weak magnetic area protection and laser lock well known in PCs can be used, etc. The advantages of this method are that it can be easily realized at a low cost, and, further, the data protected is stored on the magnetic disk such that no additional cost for the additional hardware is necessary. The disadvantages of the method lie in that it can be effortlessly defeated. Furthermore, a magnetic disk can be easily damaged and besides, the speed of reading is relatively slow. These disadvantages significantly devalue this method of protection.

Also, a number of different types of encryption methods have been provided to attempt to eliminate software piracy. One method dealing with software involves providing a ROM with an identification number that is duplicated in a program to be executed. The program periodically checks for the presence of the identification ROM. If the identification ROM is not connected in the system during execution of the program, the program crashes.

In other examples such as MegaDrive by Saga, a cryptic code is added to the memory device of the cartridge of a video game (U.S. Pat. No. 5,155,768 for "Security System for Software"). When the machine is turned on, the system software will inspect the cryptic code on the cartridge to determine its validity. However, these kind of anti-counterfeiting methods are still not effective to protect software programs from being counterfeited.

Meanwhile, in expert circles, it has been generally recognized that software cannot sufficiently protect software. Programs that are saved on the same memory means as the protection program cannot obtain complete protection, as this still allows bit by bit copying. Also, protection programs which are installed on a particular hardware basis in order to prevent specific application software from running on a machine of a different type, cannot protect against use on another machine of the same type. A solution to this problem could be the use of a so-called "dongle". A "dongle" is a connector containing an integral electronic circuit which is normally fitted to the parallel port on the PC (main machine). The electronic circuit contains a code which electronically cannot be altered or copied. This code is then read by a special authorization routine in the protected application program when this program is loaded. The application will not run unless the code is found.

Another protection device is a "dongle" such as the HASP made by Aladdin Knowledge System, Ltd., or the Centinel made by Rainbow Technologies. These devices operate through a printer port of a personal computer which they are plugged into. They are also intended to protect the software from unauthorized usage. This type of "dongle" is connected to the printer port, which utilizes programs to read the protection device through the printer port in order to determine whether the key device is being plugged in or not. The principle of protection using the "dongle" resides in writing a cryptic code into the card and then, when the software is executed, in reading the "dongle" data out of the card through the port, to determine whether there is a genuine "dongle", i.e., whether there is an authorized usage, or any restrictions on usage, and whether to continue execution of the program. The "dongles" available in the market are made by utilizing a serial EEPROM IC of 93C46 type.

The advantage of these devices is that they can be easily installed. They are much easier to use compared to the above method where the PC has to be taken apart in order to insert the Keycard into the mother board slot. However, since it is necessary to store a cryptic code in the "dongle", the card must be equipped with a memory device, and the memory device must be a non-volatile memory device such as EEPROM. The manufacturing process of such IC is rather expensive. The cost of a "dongle" tends therefore to be relatively high. This makes them unsuitable for low priced software and for mass production for low priced product such as electronic games. Only special software having higher price can utilize these protection devices.

One more drawback of this solution is that "dongle" can be easily purchased and, as long as a data on the "dongle" is read, the data can be rewritten into another purchased "dongle", so the "dongle" can be duplicated. Some of the "dongles" utilize standard ICs which can be obtained from many manufacturers such that eventually, a "dongle" can be made by a counterfeiter himself.

However, for "palmtop" PCs, as well as for many video games this is normally not a practical protection for the software because "dongles" are generally too large and too expensive for this type of equipment and, additionally, this machines frequently do not have a standard parallel port or a parallel port at all.

In video games, the memory device mentioned in the above may include a read-only memory (mask-programmable ROM), an erasable memory device (EPROM or EEPROM), or one-time programmable memory device (One-Time PROM). However, as these IC memory devices are standard products, they can be easily counterfeited.

The copyright holders of such software, being very interested in designing various methods and apparatus to prevent the illegal use or counterfeiting of video game software programs, are looking for some specific and nontraditional ways for solving the problem. U.S. Pat. No. 5,070,479 for "External memory having an authenticating processor and method of operating same" is an illustration of such an approach. The program and the data stored in the memory devices are to be delivered to the computer central processing unit (CPU) in order to execute the programs. However, since the program and the data are delivered by the buses on the main machine, it is here where these programs and data can easily be read by unscrupulous merchants in order to counterfeit and make illegal sales. The patent teaches the use of a microprocessor as a protection device. The microprocessor is installed in the game console and in the cartridge, and, after the game console is turned on, the protection devices will communicate with each other. If the data do not match, it will reset the CPU to stop the execution of the game program. However, this protection method can be easily defeated by duplicating such protection device (the IC), even at a substantial amount of effort. Additionally, since this type of protection IC can also be used on other software, it encourages counterfeiters in mass producing the counterfeited product. Once the protection device in a game machine is disabled, all the software programs using this device are no longer protected. In some instances, as long as the function of stopping the computer to execute is disabled, a counterfeiter may not even require the counterfeiting of such protected device in order to achieve their illegal purpose.

In another example of the PC Engine by NEC, the memory IC on the cartridge is manufactured by a special process, i.e. a read-only memory that has higher access speed mentioned in the above. These devices were effective for protection purposes when they made a debut on the market, however, with the progress in the semiconductor technology, the manufacture of a high speed read-only memory is no longer a difficult problem and therefore the protection function of these type of devices is no longer sufficiently effective.

Also known is the using of so-called Keycards for software protection. This approach involves a special interface card plugged into a slot on a mother board, from which card the data are read. The advantage of this approach is that the Keycard cannot be easily duplicated and, further, that the access speed is much higher. A great number of authentication checks can be performed in the program. In order to install the interface card, however, the main machine must be disassembled which is very inconvenient. This represents a major drawback of such an approach. Furthermore, it may also cause incompatibility problem with different machines, and some machine may not have sufficient expansion slot to allow the installation of an additional card, for example in a notebook computer.

It is highly improbable to design a software protection device that cannot be defeated over the long run. The purpose therefore is to devise the protection device of such a kind that for a potential counterfeiter there would be no incentive to solve his problem and/or the counterfeit be of a very high cost, and that the objectives of protecting software can thus be achieved. One of the best methods to accomplish these ends is to make a special purpose IC, rather than using a standard IC. In the absence of this special purpose IC, the ROM of a counterfeit cartridge even successfully copied still cannot be utilized, unless the counterfeiter can also obtain or counterfeit the special purpose IC. Since special purpose ICs can be tightly controlled by the manufacturers, and the cost of reproducing such ICs is very high, the counterfeiting of thus protected device will pose major problems. The special purpose IC appear to be more difficult to be duplicated since they mostly require the use of a special processing technology in the manufacturing.

It is therefore an object of the present invention to provide a method and a device for protecting computer software that does not have the drawbacks of the prior art protection methods and apparatus.

It is another object of the present invention to provide a method and apparatus for protecting computer software such that any counterfeit attempt be fraught with considerable difficulties and can be a major challenge for a counterfeiter.

It is one more object of the present invention to provide a computer software protection that is fast and occupies minimum chip area as compared with an approach using ROM.

It is yet another object of the present invention to provide a computer software protection that is substantially secure against software piracy without significantly adding to software costs.

These and further objects of the invention will be made clear and become apparent during the course of the following description of preferred embodiments of the invention.

BRIEF SUMMARY OF THE INVENTION

In accordance with the present invention, there is provided an apparatus for protecting software in a program-controlled object such as a video game. The object has a main part with a controlling means, and a replaceable part with a memory means. The memory means stores an execution program and an inspection program. Besides the memory means, the apparatus also comprises a data generator located on the replaceable part and controlled from the controlling means. The data generator produces specific data cooperating with the software. The positive result of the cooperation (preferably, of the comparison) is used to verify the existence of an authorized hardware and give an authorization for performing the execution program.

The apparatus according to the present invention may further comprise a selection means located on the replaceable part. The selection means are controlled from the controlling means of the main part and used to select a mode of generation of the specific data.

The selection means may be selected from the group consisting of a register, a memory device, and a programming method in IC technology.

The apparatus according to the present invention may further comprise an interface circuit for connecting the data generator and the selection means to the main part. The interface circuit may include a decoder and a data buffer.

There is provided also a program-controlled system comprising a main part and a replaceable part. The main part includes a central processing unit and a peripheral equipment cooperating with the central processing unit. The replaceable part includes a memory unit and a software protection device. The memory unit stores software including an execution program and an inspection program. The software protection device comprises a data generator, a selection device for selecting a predetermined mode of operation of the data generator, and an interface circuit for connecting the data generator and the selection device to the main part. The data generator is controlled by the central processing unit of the main part and is adapted to generate specific data cooperating with the software. The positive result of this cooperation (preferably, of the comparison) is used to authorize performing of the execution program.

The corresponding method for protection software is proposed for controlling a video game or another program-controlled object comprising a main part and a replaceable part. The main part includes a controlling means, the replaceable part includes at least a memory means for storing software including an execution program, and a data generating means. In accordance with the present invention, the method resides in providing an inspection program with predetermined data in the software; initializing the data generating means to produce specific data; reading the specific data; and cooperating the specific data with the predetermined data from the inspection program. A positive result of the cooperation (preferably, of the comparison) is used to authorize performing the execution program of the software running the object.

The method for protection software according to the present invention may further comprise a step of selecting a mode of generating data by the data generating means. The selection is to be performed by a selecting means, and in this case the specific data is to be produced in the selected mode.

The predetermined data in the inspection program may be made up of numerical data series, whereas the specific data produced by the data generating means can be numerical data series. The cooperating of the predetermined data with the specific data will then take the form of comparing them to each other to determine the existence of the authorized hardware.

The predetermined data in the inspection program may comprise a code block and a data block, the data block being an anticipated result of a predetermined calculation. The specific data produced by the data generating means may appear as numerical data. Then, the cooperating of the predetermined data with the specific data is performed by executing the predetermined calculation over the numerical data under a control of the code block, and by comparing a result of the predetermined calculation with the anticipated result.

The above-mentioned predetermined calculation may be in the form of a calculation of a frequency of appearance of a number in the numerical data produced by the data generating means.

The method of protecting software according to the present invention may provide for including in the inspection program a certain program code for inspection of the appearance of certain numerals, or the appearance of certain numerical series, generating numerals and numerical series, reading numerical series, when the predetermined certain numerals or certain numerical series appear, and using them for executing certain corresponding functions. Among those functions, the instructions in the CPU, such as ADD, SUB, XOR, JUMP, or corresponding subprograms may be.

To increase the difficulty of counterfeiting computer software and backtracking a method of generating a data sequence, a method of protecting the computer software may include providing a programming code in the inspection program, for calculating an interval of appearance of numeral in a numerical series, and providing certain data in the inspection program as a preset range of the appearance, generating the numerical series, reading the numerical series and then calculating the frequency of appearance of the numeral, to determine whether the interval of appearance is within the preset range, in order to determine the existence of a hardware as a base to perform the execution program.

The method of software protection may include providing a block of encrypted program code, or data after coding in software, setting a numerical data series generating device into a predetermined condition, initializing generating numerical data series, and decoding the program code or data after coding using the generated numerical data series.

BRIEF DESCRIPTION OF THE DRAWINGS

In the drawings, which form an integral part of the specification and are to be read in conjunction therewith, and in which like reference numerals are employed to designate identical components in the various Figures:

FIG. 4 is an example of a numerical series generated by the generator of FIG. 3.

FIG. 5 is another example of a numerical series generated by the generator of FIG. 3.

DETAILED DESCRIPTION OF THE PREFERRED EMBODIMENTS

Most software protection devices include two essential components, the first one is a means for storage used to keep a verification data wherein such data are difficult to be duplicated. The other is a programming code for inspecting and verifying such data. The programming code is included in the software, the verification data in the memory means being detected for whether they are in existence and proper, and if they are not or mistaken, the program would stop execution or cause the machine down.

In a "dongle", for example, the EEPROM is used to store the verification data. The cost of manufacturing involving EEPROM is very high. The present invention utilizes a numerical series generating device to replace storing the verification data in the memory, therefore a less costly IC manufacturing process can be used. Furthermore, the present invention utilizing a pseudo-random generator, or even a counter, or any other circuit that can generate a sequence of numbers allows the use of smaller IC area to produce a large volume of verification data such that it is becoming at a much more reasonable price as compared to storing verification data in the memory device.

It is also considered that if most of software end up using one common special purpose IC, then a mass production of such IC will enable counterfeiting of the IC. However, if each software uses a different IC, the mass production of the ICs is not possible. However, it will result in a higher level of the IC cost. To reduce the cost, different known technologies for manufacturing IC, such as bonding option, metal option, or code implant, can be used. By using these known technologies, along with a means for performing the selection of a mode of the IC operation, an IC can be manufactured in many different kinds of ICs. The function of the IC is therefore changed for the purpose of protection against counterfeiting of such IC. Now, the IC can actually be designed using the same design such that it can be mass produced in order to reduce its cost.

The principal idea of the invention is to use a random number generator to replace ROM. RNG makes it possible to produce the same number of patterns with simpler hardware design and at less cost. Varying initial states results in producing different sequences, to make copying even more difficult. Using different types of selection discussed in more detail below can let ICs appear in different modes with the same body making copying even further more complicated.

Figure 1:
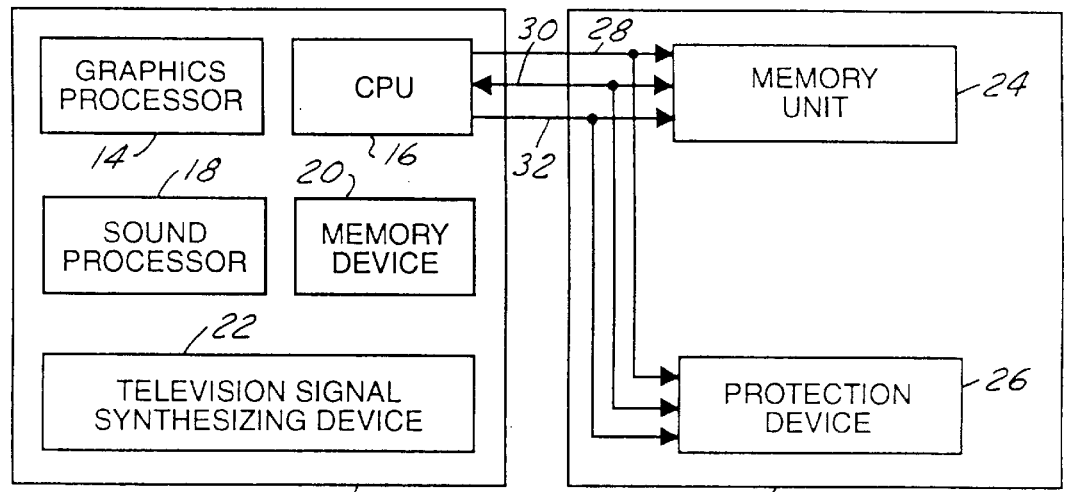
FIG. 1 shows a block diagram illustrating a structure of the implementation of a video game using software protection.

FIG. 1 is a block diagram illustrating a typical video game system structure. It includes a game console 10 and a replaceable part, a game cartridge 12. As a rule, the game console 10 also includes a graphics processor 14, a CPU 16, a sound processor 18, a memory device (RAM) 20 storing data, and a television signal synthesizing device 22. The game cartridge 12 includes a memory unit 24, which is normally a mask ROM, and a software protection device 26. The main machine 10 is connected with the cartridge 12 by means of address, data, and control bus 28, 30, and 32, respectively.

Figure 2:
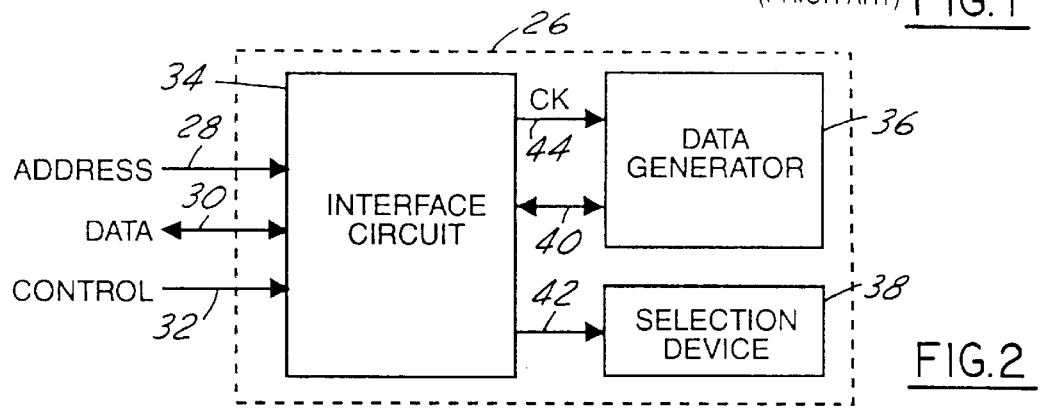
FIG. 2 depicts a block diagram of a software protection device according to the present invention for use in the object of the type shown in FIG. 1.

As shown in FIG. 2, the present invention software protection device 26 includes an interface circuit 34 (that usually consists of a decoder, a data buffer, and other convenient circuits not shown in the Figure) for connecting to the game console 10, a data generator 36 which in fact can be a random numerical series signal generator or a number generator, and a selection means 38 for a selection of a mode of the data generator 36. The software stored in the memory unit 24 comprises an inspection program which is used to inspect signals produced by the generator 36, in order to use it as a reference for performing an execution program, another part of the software. The CPU 16 executes a program to examine the match of the sequence generated and the sequence stored in the program or generated by the program. The selection means 38 may be a device like a register, a memory device such as EPROM, EEPROM, or one of known programming methods for IC such as bonding option, metal option, code implant can be used for that purpose.

As it is appreciated for those skilled in the art, a bonding option involves connecting a certain pad to VCC, or ground, or floating on an IC chip during the packaging stage so that the pad has different states of VCC, GND, and floating, the states being able to be used for a control function such as selection of a generating method. Similarly, a metal option lies in the use of a layer of metal for a certain signal line laid on an IC chip to VCC, GND, or to another signal line. The reason to use the metal option is because it is one of the last IC processing steps. Different metal masks can be easily changed to produce different ICs. Finally, a code implant calls for using a code implant photomask to mask the device such that the signal line's on or off states can be changed in order to achieve the effect of the selection. The above three approaches are the IC programming methods well known in the art. Using these methods for counter-counterfeiting, however, is believed to be unknown. Utilizing a few changeable photomasks or bonding the pad to different voltage positions during packaging allows to achieve ICs of different kinds from the same IC body and adds significantly to make counterfeiting even more complicated problem.

Using a path 40, the data generator 36 outputs its signals to the CPU 16 via the interface circuit 34. When the selection device 38 is a register, the CPU 16 writes a selection signals thereinto using a line 42. A line 44 is employed for sending clock signals to the data generator 36, which produces the next numerical series signal sequence at each clock signal 44, whereas a line 46 is used for addressing the data generator 36 from the selection device 38 to select a specific mode of operation of or, the type of the sequence produced by, the generator 36. The output of the generator 36 comprises outputs of flip-flops 54, 56, 58, and 60 as shown in FIG. 3.

Figure 3:
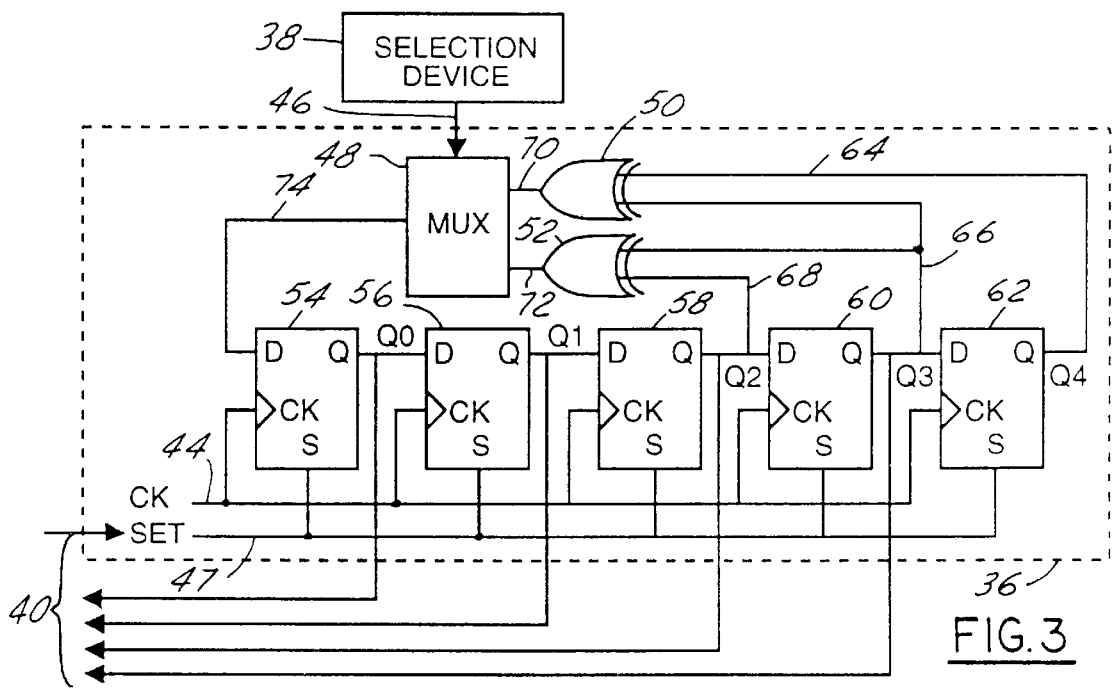
FIG. 3 is a variant of realization of a random numerical series signal generator for the software protection device according to the present invention.

FIG. 3 shows a 5-bit random number generator 36 triggered by the clock signal 44 to produce the next numerical value. A signal 47 is sent from the CPU 16 via the path 40 for setting circuits of the generator 36 in a specific condition. The data generator 36 shown in FIG. 3 has two modes. The selection between the two modes is performed in a multiplexer (MUX) 48 controlled by the selection device 38 over the line 46. The MUX 48 is input by two EXCLUSIVE OR (XOR) logic gates 50 and 52. The set signal 47 when being in the state of 11111, transfers this state as a starting value for flip-flops 54, 56, 58, 60, and 62 of the generator 36 to set the IC into a respective condition. One of the above-mentioned modes of the generator 36 selects outputs Q3 and Q4 of the flip-flops 60 and 62, respectively, for activation a result 70 of an XOR gate 50. The second mode selects an output Q2 and an output Q3 of the flip-flops 58 and 60, respectively, for a result 72 at the output of an XOR gate 52. The output of the generator 36 comprises the outputs of the flip-flops 54, 56, 58, and 60 as shown in FIG. 3.

Examples of numerical series generated by the data generator 36 regarding the first and the second modes are shown in FIG. 4 and FIG. 5, respectively. There can be different forms of data generated by the data generator 36, and there may be different ways of commanding these data according to the present invention. The data generated by the data generator can be a sequence of signals which sequence is compared with a corresponding sequence of signals from the inspection program; or the data generator 36 may produce a sequence of numbers which is to be calculated in accordance with the inspection program, and a result of this calculation is to be matched with a corresponding result stored in the inspection program; also, the data generated by the data generator can be a code means and then the code means is to be used for a decoding ("unlocking") of a corresponding part of the software; etc.

The selection device 38 is used to select the mode of operation of the data number generator 36 which may be a register so that the CPU 16 can write a selecting signal thereinto to control or select from the two modes, or it can be a memory device such as EPROM. Otherwise, it can be a bonding option, a pin option, a metal option, or a code implant such that can be determined by a manufacturer. If the bonding option is used, only when the IC is sealed (encapsulated by a passivation material, for instance by plastic or ceramic), bonding the pad on the die to VCC or GND pin is equivalent to selection of the multiplexer to 1 or 0, or selection of different modes of operation, in order to make two different function IC. The selection of one or another of the above-mentioned options poses additional problems for those attempting illegally copying. For instance, if the metal option or the code implant is used, it only requires one additional photomasking in the IC manufacturing process in order to produce different functions in the IC (one mask to fabricate one mode of operation, and another mask to produce another mode of operation) which will make duplication an additionally more complicated and more difficult process. The selection when it is made alters generating numerical series and the series thus generated. Also, it changes an inspection program as a part of an execution program.

The corresponding method for protecting software may be realized for controlling the above-mentioned program-controlled object such as a video game which video game comprises a main part (specifically, the main part 10) with a controlling means (specifically, the CPU 16) and a peripheral equipment (specifically, blocks 14, 18, 20, and 22); and a replaceable part (specifically, the part 12) with a memory means (specifically, the memory unit 24) for storing software including an execution program, and a data generating means (specifically, the data generator 36). According to the present invention, the method resides in the following series of steps:

a) providing an inspection program, comprising a predetermined data, in the software;

b) initializing the data generating means to produce a specific data;

c) reading the specific data; and d) cooperating the specific data with the predetermined data from the inspection program. The positive result of the cooperation is used to authorize performing the execution program of the software running the object.

A step of selecting a mode of generating data by the data generating means can be added to the method, this selecting being performed by the selecting means (specifically, the selecting device 38), and the step of initializing the data generating means will thus be performed in the selected mode or it can be performed independently, that is the mode can be selected once, and the initialization can take place in every check. Or one initialization and a number of different selections can be performed.

In one of the aspects of the method according to the present invention, the inspection program may contain a predetermined numerical data series. The specific data produced by the data generating means will in this case be in the form of a numerical data series and will be compared with the predetermined numerical data series in the inspection program to determine that an existed hardware (the replaceable part 12) is the authorized hardware and thus to authorize performing the execution program running the object.

In another aspect of the method of the present invention, it provides that the inspection program stored in the memory unit 24 is supplied with a code block for executing a predetermined calculation over a numerical data generated by the data generator 36, and also supplied with a data block representing a result of this predetermined calculation. Then, the data generator is initialized, the numerical data from the data generator is read, and the predetermined calculation is performed in the CPU 16. Finally, a result of this calculation is compared with what was stored in the program as the result, in order to determine the possibility of performing the execution program running the object.

In the special case of that aspect of the present invention, the method includes providing a programming code in the inspection program for calculating a frequency of appearance of a certain numeral in a numerical series, providing data in the inspection program for predicting a result of the calculation, generating the numerical series, calculating the frequency of appearance of the certain numeral in the generated numerical series, and inspecting the result to determine whether it matches the prediction from the software, for use as a base for determining the possibility of performing the software.

In still another aspect of the present invention, the method of software protection may include providing a certain programming code in the inspection program for the inspection of appearance of certain numerals (certain numerical series in a special case), generating numerals, reading the predetermined certain numerals (or the numerical series) when they appear, and using them for executing certain corresponding functions in the execution program of the software.

Among those functions may be the instructions in the CPU, such as ADD, SUB, XOR, JUMP, or corresponding subprograms.

In yet another aspect of the present invention, the method of software protection proposes providing a block of coded data (an encrypted program code or data after coding) in the execution program, initializing the data generating means to produce numerical data series, and using the generated numerical data series for decoding the coded data.

To increase the difficulty of counterfeiting computer software and backtracking a method of generating a data sequence, in still yet another aspect of the method according to the present invention, a programming code is provided in the inspection program for calculating an interval of appearance of a numeral in a numerical series, and the inspection program is also supplied with certain data as a preset range of the appearance. Then, by virtue of the data generating means, the numerical series are produced and read. The frequency of the appearance of the numeral is calculated to determine whether the interval of the appearance is within the preset range, in order to determine the existence of a hardware as a base to perform the execution program.

To even more increase the difficulty of counterfeiting a computer software, the above-mentioned aspects of the present invention can be used in different combinations thereof.

Having thus described the invention, it is recognized that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

We claim:

1. An apparatus for protecting software in a program-controlled object such as a video game, said object having a main part with a controlling means, and a replaceable part with a memory means storing said software, a part of said software being coded in the form of an execution program and an inspection program, said replaceable part comprising a generating device and a selection means controlled from said controlling means, for generating specific data in a mode of a plurality of modes preselected by said selecting means, said data being used by said inspection program to verify the existence of an authorized hardware and give an authorization for performing said execution program.

2. The apparatus according to claim 1, wherein in a first mode of said plurality of modes said data generated by said data generator is a sequence of numbers to be calculated under control of said controlling means in accordance with said inspection program, a result of said calculation being matched with a corresponding result stored in said inspection program.

3. The apparatus according to claim 1, wherein in a second mode of said plurality of modes a part of said execution program is encrypted and said data generated by said data generator is a code means to be used under control of said controlling means for a decoding of said encrypted part.

4. The apparatus according to claim 1, wherein said selection means is selected from the group consisting of a register, a memory device, and a programming method in IC technology.

5. An apparatus according to claim 1, further comprising an interface circuit for connecting said generating device and said selection means to said main part, said interface circuit including a decoder and a data buffer.

6. A program-controlled system, comprising:
   a main part including:
   a central processing unit and peripheral equipment controlled from said central processing unit, and
   a replaceable part including:
   a memory unit, said memory unit storing software, said software including an execution program and an inspection program, said inspection program comprising a code block and a data block, said data block being an anticipated result of a predetermined calculation, and
   a software protecting device, said software protecting device comprising a data generator, said data generator being controlled from said central processing unit and generating a sequence of numbers to undergo said predetermined calculation under control of said central processing unit and said code block, a result of said calculation being matched with said anticipated result, the positive result of said matching being used to authorize performing of said execution program.

7. A method for protecting software controlling a program-controlled object such as a video game, said object comprising a main part and a replaceable part including at least a memory means for storing software including an execution program, and a data generating means, said method comprising the steps of:
   a) providing an inspection program in said software, said inspection program including a programming code for a calculation of a interval between appearances of a number in a numerical sequence, and predetermined data as a predicted range for results of said calculation;
   b) initializing said data generating means to produce said numerical sequence;
   c) reading said numerical sequence;
   d) executing said calculation over said numerical sequence under control of said programming code to obtain said interval, and
   e) ascertaining whether a result of said calculation falls into said predicted range, to authorize performing said execution program of said software running said object.

8. The program-controlled system according to claim 6, wherein said predetermined calculation is a calculation of a frequency of appearance of a number in said sequence of numbers.

9. A method for protecting software controlling a program-controlled object such as a video game, said object comprising a main part and a replaceable part including at least a memory means for storing software including an execution program, and a data generating means, said method comprising the steps of:
   a) providing an inspection program in said software, said inspection program including a programming code;
   b) initializing said data generating means to produce a numerical sequence;
   c) reading said numerical sequence under control of said programming code for ascertaining appearance of certain numbers in said numerical sequence; and
   d) using said certain numbers for executing predetermined functions in said execution program.

10. The method according to claim 9, wherein said functions include instructions from a CPU such as ADD, SUB, XOR, JUMP or other subprograms.

* * * * *